Dec. 9, 1952 A. LESTI 2,621,323

PULSE CODE MODULATION SYSTEM

Filed Feb. 26, 1948 2 SHEETS—SHEET 1

INVENTOR.
ARNOLD LESTI

BY RP Morris

ATTORNEY

Dec. 9, 1952 A. LESTI 2,621,323

PULSE CODE MODULATION SYSTEM

Filed Feb. 26, 1948 2 SHEETS—SHEET 2

INVENTOR.
ARNOLD LESTI

BY

R P Morris

ATTORNEY

Patented Dec. 9, 1952

2,621,323

UNITED STATES PATENT OFFICE 2,621,323

PULSE CODE MODULATION SYSTEM

Arnold Lesti, Brooklyn, N. Y., assignor, by mesne assignments, to International Standard Electric Corporation, New York, N. Y., a corporation of Delaware Application February 26, 1948, Serial No. 11,262

10 Claims. (Cl. 332—1)

This invention relates to a system for converting pulse amplitude modulations into pulse code modulations and more particularly to a converter system utilizing a cathode ray tube.

Various methods and systems for converting pulse amplitude modulations into pulse code modulations have been proposed in the past. These systems may be roughly divided into two groups, one employing an indirect conversion method where electronic sampling is resorted to and a second group where a direct conversion of the amplitude variable signal pulses takes place into equivalent pulse code modulations. In the latter group cathode ray tubes have been known as coders or converters for some time.

It is an object of this invention to provide a cathode ray tube type converter which is effective in producing simultaneously all parts of the pulse code corresponding to a given input level or amplitude.

A further object is to provide a cathode ray tube pulse code modulation converter wherein the difficulties due to alignment are greatly minimized.

In accordance with certain features of the invention I provide a pulse amplitude to pulse code modulation converter essentially comprised of a cathode ray tube which includes as the target for the cathode ray beam a given number of coding bars or other electron beam targets arranged in parallel or in other rows and which are swept by the beam of the line type simultaneously. The coding bars include high and low secondary emission portions which are arranged on the various bars so as to provide for each given amplitude level as expressed by the deflection of the beam, a predetermined code pulse combination. Any given number of channels may be combined by the use of suitable keying. In order to improve the operation of the system a beam centering circuit and a code quantizing circuit has been provided, as a means for controlling the operative stability of the system.

The above mentioned and other features and objects of this invention and the manner of attaining them will become more apparent and the invention itself will be best understood by reference to the following description of an embodiment of the invention taken in conjunction with the accompanying drawings, wherein.

Figure 1:
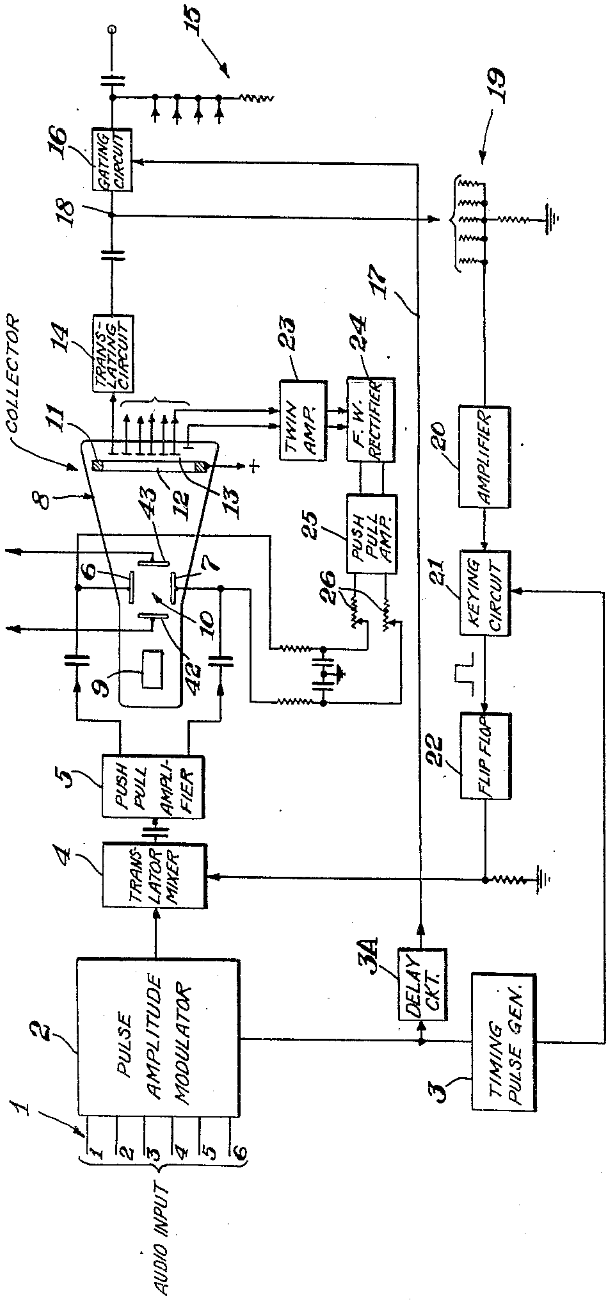
Fig. 1 is a diagram partly in block form illustrating the circuit elements of a complete conversion system in accordance with the present invention.

Referring to the conversion circuit shown in Figure 1, a number of audio input channels indicated at 1 are connected to feed a common pulse amplitude modulator 2 which receives suitably timed unmodulated pulses from a pulse generator 3. The pulses of the various channels which form a consecutive train or pulse sequence and which are obtained from the modulator 2 modulated in their amplitude according to the instantaneous value of the signal in the respective channels, are fed into a translater and mixer circuit 4 and from there through a push-pull amplifier 5 are applied in push-pull to the two horizontal deflection plates 6 and 7 of a cathode ray type pulse code modulation converter tube 8. The converter tube 8 is comprised of conventional operating elements including an electron gun 9, for producing a line type beam, a set of vertical and horizontal deflection plates 10, a collector electrode 11 and a number of coding bars 12, acting as a target for the cathode ray beam in the tube 8. In addition a set of center of modulation stabilizing bars are provided as indicated at 13. As will appear in connection with the detailed showing of Figure 2, all of the bars 12 and 13 are swept simultaneously by the cathode ray beam. These bars provide an individual output to their respective translating circuits 14 as shown for example for the first bar. Signals obtained from the circuits 14 are combined in a mixer circuit 15 by way of suitable individual gating circuits 16.

These gating circuits are controlled by means of pulses obtained from the pulse generator 3 and a suitable delay circuit 3A over a connection 17. In order to obtain so-called quantizing of the line beam deflection with respect to the code pulse producing portions of the coding bars a control circuit is provided which derives a signal proportional to the output of one of the coding bars as shown for the purposes of illustration for the first bar at a point 18 between the translating and gating circuits 14 and 16 respectively. The output of the coding bars is combined in a mixer circuit 19, fed through an amplifier 20 and by way of a keying circuit 21, which is controlled from the timing pulse generator 3, is applied to a double stability type flip-flop circuit 22. This latter circuit responds to the presence or absence of pulse code signals only so that in case the line beam comes to rest in between indication producing portions on the coding bars, the flip-flop circuit 22 will operate from one to the other of its two stable conditions and thus provide an additional voltage increment for the amplitude modulated pulse as applied to the mixer circuit 4. The line beam is given thereby additional deflection to one side or the other which is sufficient to place it astride an indication producing spot on the coding bars.

A stability control circuit is also provided to maintain stability in the symmetry of deflection of the cathode ray beam with respect to the center point of operation which would correspond to the point where no audio modulation is present. This circuit is fed from the two halves of a stabilizing bar indicated at 13. The output of the stabilizing bar portions is fed into a twin amplifier 23 and from there into a twin or dual type rectifier 24. The rectifier output of the stabilizing bars is then applied through a push-pull amplifier 25 as an additional deflector voltage to the two horizontal deflection plates 6 and 7 in accordance with the resultant differential signals obtained from the two stabilizing bar portions, one or the other side being adjusted to center the beam properly. A gross manual control for beam centering is provided as at 26.

Figure 2:
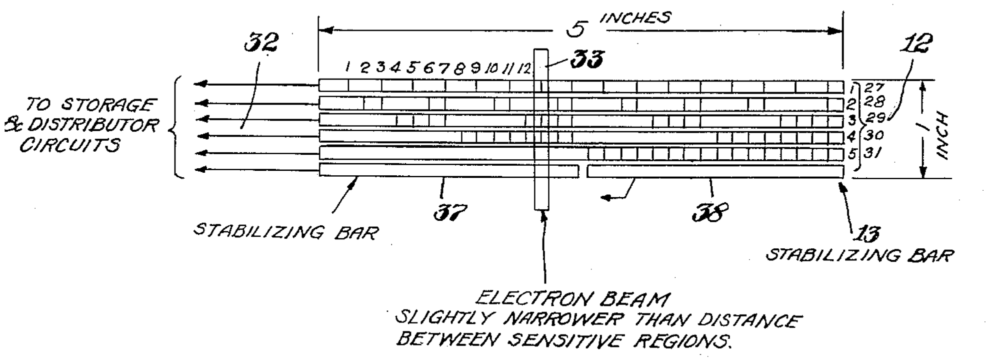
Figure 2 is a plan view of the cathode ray beam target in the cathode ray converter tube illustrating the coding bars of the system in Figure 1.
Figure 3:
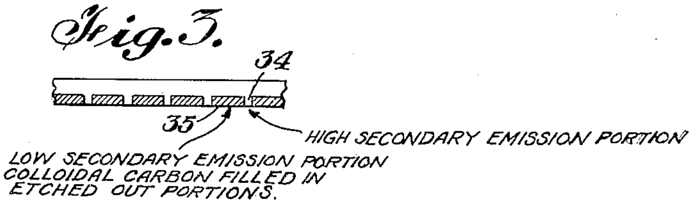
Figure 3 is a cross-sectional view of one of the bars shown in the plan of Figure 2.
Figure 4:
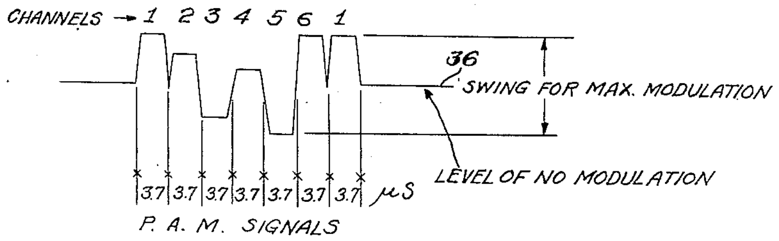
Figure 4 is a representation in graph form of sample amplitude modulated pulses which are to be converted by the system in accordance with the invention.

The coding and stabilizing bars will now be discussed in detail with reference to Figure 2. It is seen therefrom that a total of five parallel coding bars have been provided indicated at 27 through 31 respectively. Although the view shows five coding bars for a design employing a thirty-two code system, actually a much greater number is generally contemplated in accordance with the desired accuracy of reproduction for the P. A. M. (pulse amplitude) to P. C. M. (pulse code modulation) conversion. The code bars are insulated from each other and a lead is connected to each and brought out of the tube for connection to associated circuit components the leads being indicated at 32. All of the coding bars are held together mechanically on an insulating form of glass or other suitable material. The code arrangement itself is etched out of the bars preferably by a photoengraving process. The portions etched out as shown in the sectional view in Figure 3 are filled with a material such as colloidal carbon to provide low secondary electron emission in response to the impingement of the cathode ray beam, the remaining portions being sensitized for a high secondary emission. The line beam is shown in relative size at 33. It is seen therefrom that a simultaneous sweeping of all the target rows or bars may be achieved, the deflection along the length of the bars being proportional to the applied amplitude variable pulse. The length dimensions of the bars and the location of the related code producing portions of the bars is such that they correspond to a predetermined number of levels into which the maximum foreseeable amplitude of the variable amplitude pulse has been divided. In the present instance thirty-two such levels have been chosen to represent the total maximum amplitude. Thus as a result of the application to the two horizontal deflection plates 6 and 7 of a pulse of a given amplitude the line beam will shift rapidly in a horizontal direction and will come to rest in a position corresponding to the voltage of the particular amplitude pulse modulation channel supplying the deflecting pulse, for a certain period of time. For any given amplitude only the beam will come to rest on certain bar portions which will give a comparatively high secondary emission in accordance with preestablished coding. For instance, in the example shown in Figure 2 the bars 1, 3 and 4 are being activated. The high secondary emission portions of the bar shown in cross section in Figure 3 are indicated at 34 and the low secondary emission portion which has been filled with colloidal carbon are shown at 35. In Figure 4 representative amplitude modulated pulses have been shown for the six channels illustrated in Figure 1. In this view the line shown at 36 indicates the level of zero modulation corresponding to the midpoint of the two center of modulation stabilizing bar members, which are shown at 37 and 38. These stabilizing bar members have a uniformly high rate of secondary emission and each bar is connected to a corresponding half of a twin amplifying circuit 23 as already discussed in connection with Figure 1.

Figure 5:
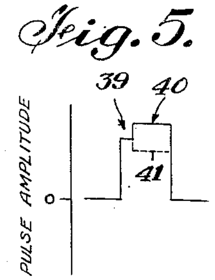
Figure 5 is a graphical representation of an amplitude modulated pulse to illustrate the principle of quantizing in the system of Figure 1.

In operating the system discussed above, pulses of the type shown in Figures 4 and 5 will be obtained from the pulse amplitude modulating circuit 2. The initial amplitude modulated pulse as effective with respect to the deflection plates 6 and 7, would be as indicated at 39 (Fig. 5). The line beam will be made to sweep across the five coding bars and will come to rest entirely in a position corresponding to the amplitude 39. If this position of the beam should be productive of a signal, that is if the beam should come to rest astride a set of high secondary emission portions on the bars, no further correction will take place in respect to the deflection of the beam. Such a beam position would mean that the beam, which has a sufficient width to be somewhat narrower than the distance between adjacent bar regions, has actually contacted such a region corresponding to one of the thirty-two amplitude coding levels. The resulting pulse will be fed over the corresponding translating and gating circuit to a common output circuit 15. The deflecting pulses are of sufficient duration to cause the build up of coding pulses from the bars up to a certain predetermined voltage level. These coding pulses are thus made of sufficient amplitude to actuate the translating circuit 14 which preferably includes a storage tube circuit and from there are fed into the gating circuit which also acts as a distributor for the pulse signals. As already indicated this distributor circuit is connected to the timing generator so as to be synchronized or gated therefrom to a different time period for each of the coding bars. The result in the common output is a pulse code modulated signal corresponding to the amplitude of the applied pulse which is applied to other circuits for further processing. When scanning the coding bars it is apparent that due to the arrangement of the bars and the line beam the code itself will be produced simultaneously and will enable alignment difficulties to be substantially eliminated. Should the initial deflection of the electron beam for example corresponding to the level 39 of a pulse such as shown in Fig. 5 be such as to cause the beam initially to come to rest between coding position indicating portions of the bars, no code indication would be obtained. The consequent lack of output from the five bars will cause deblocking of the keying circuit 21 and produce a pulse into the flip flop circuit 22. A pulse from the circuit 22 will thus be obtained which when added to or subtracted from the amplitude of the pulses responsible for the horizontal deflection of the beam, will cause the resultant operative amplitude of the original deflecting pulse to be increased or decreased to a value as at 40 or 41 depending on the relative position of the line beam. As a consequence the beam will be shifted to the left or the right to assure a code indication corresponding to the nearest corresponding one of the thirty-two amplitude levels. In order to overcome the operative instability of the center point of the operation, that is, the code corresponding to no audio modulation, the second control circuit discussed in connection with the stabilizing bars 37 and 38 has been provided. The pulses from each of the bar portions 37 and 38 are amplified separately in the twin amplifier 23 and are separately rectified in the circuit 24 which is effective in producing positive D. C. voltages applied to the grids of the push-pull amplifier 25. If both stabilizing bars receive the same number of beam excursions the rectified outputs of the circuit 24 will be the same and voltage into the two grids of the push-pull amplifier 25 will be the same. This voltage being in phase will not be amplified and hence will have no effect on the bias voltage of the deflection plates. If, however, the stabilizing bars are exposed to different beam sweep portions, due to a shift in the center point at which the line beam would come to rest with or without modulation, the beam will act on one bar portion with respect to the other for a comparatively longer period of time. In that case the rectified output of one side of the rectifier 24 would be different from that of the other side. Hence there would be a difference in voltages which is applied to the grids of the push-pull rectifier 25 which will be amplified and cause a change in the voltage applied to the deflection plates. This is in such a direction as to bring the beam back onto the center.

If a tube producing a line beam is not being used in accordance with the above discussion the vertical deflection plates shown at 42 and 43 may be used for a vertically directed scanning signal having a saw-tooth or sinusoidal characteristic. The frequency of such a sweep will then be synchronized with those of the time period or duration of the applied amplitude modulated pulses. As an alternative the frequency may be much higher to produce in effect the equivalent of a line beam.

While I have described above the principles of my invention in connection with specific apparatus, it is to be clearly understood that this description is made only by way of example and not as a limitation to the scope of my invention.

What is claimed:

1. An electronic system for converting an amplitude modulated signal into a given multiple element pulse code indication comprising an electron discharge device having a plurality of target strips arranged in accordance with said code, means for projecting an electron beam on to said target strips of sufficient width to simultaneously touch all said strips, and means responsive to the amplitude of said signal to deflect the beam along the strips to a position corresponding to the code representation of said amplitude.

2. An electronic system for converting an amplitude modulated signal into a given multiple element pulse code indication comprising an electron discharge device having a plurality of rows of target elements arranged in accordance with said code, means for projecting an electron beam on to said target elements of sufficient width to simultaneously touch all the rows, and means responsive to the amplitude of said signal to deflect the beam along the rows to a position corresponding to the code representation of said amplitude.

3. An electronic system for converting an amplitude modulated signal into a given multiple element code pulse indication, comprising means for supplying pulses each modulated from a given amplitude in accordance with the instantaneous amplitude of a variable amplitude audio signal at a different one of succesive intervals of time; means for simultaneously producing a multiple element code pulse indication corresponding to and directly in repsonse to each pulse, said producing means comprising a cathode ray tube pulse amplitude to code pulse modulation converter having an electron gun, a set of electron beam deflection means and a target having a number of parallel bars disposed for simultaneous sweep by the cathode ray beam; and means forming an output circuit for said system operatively connected to said producing means.

4. An electronic system according to claim 3 wherein said target includes center of modulation stabilizing bar portions.

5. An electronic system according to claim 3 further including means for maintaining stable the center of modulation of said amplitude modulated signal with respect to said code pulse producing means.

6. An electronic system according to claim 5 wherein said maintaining means includes secondary electron emitting bar portions in a cathode ray tube and a circuit for providing electron beam deflection bias controlled from said bar portions.

7. An electronic system according to claim 3, further including means for quantizing the amplitude modulated pulses.

8. An electronic system according to claim 7, wherein said quantizing means includes a plurality of target bars in a cathode ray tube having high and low secondary electron emitting portions and a circuit responsive to absence of code pulse signals in said output circuit means for providing a cathode ray beam deflecting voltage.

9. For use with a pulse amplitude to binary pulse code converting system, a pulse converter comprising a cathode ray tube including an electron gun for producing a line type cathode ray beam, a set of deflection plates for said beam, and a code pulse producing target for said beam comprising a plurality of parallel bars having low and high secondary electron emission portions disposed to provide a plurality of simultaneous code pulses when exposed to said line beam and a pair of secondary electron emitting bar members for stabilizing the center of modulation of said amplitude modulated pulses.

10. An electronic system for directly converting an amplitude modulated pulse signal into binary code pulse indications, comprising a multichannel amplitude to pulse amplitude converter; a cathode ray tube for directly converting said pulse amplitude modulated signals into binary pulse code signals including electron gun and beam deflection means, for producing a line type beam, a target for said beam having a plurality of parallel bars having high and low secondary electron emitting portions for simultaneous sweep by said beam; an output circuit for each of said coding bars including circuit gating means, circuit means for combining the output of said output circuits; quantizing circuit means controlled from said output circuit including a flip-flop circuit and means connecting said flip-flop circuit with said beam deflecting means; means for stabilizing the center of modulation of said amplitude modulated pulses with respect to said target including secondary electron emitting bar portions forming part of said target, a control circuit including a twin amplifier connected to said bar portions and a dual rectifier supplied from said twin amplifier, and means connecting said dual rectifier and said deflecting means for centering said beam, and synchronizing pulse generating means connected to control said converter and said gating means.

ARNOLD LESTI.

REFERENCES CITED

The following references are of record in the file of this patent:

8

UNITED STATES PATENTS

| Number | Name | Date |
|---|---|---|
| 2,171,150 | Shelly | Aug. 29, 1939 |
| 2,417,450 | Sears | Mar. 18, 1947 |
| 2,429,631 | Labin et al. | Oct. 28, 1947 |
| 2,445,568 | Ferguson | July 20, 1948 |
| 2,458,652 | Sears | Jan. 11, 1949 |
| 2,463,535 | Hecht | Mar. 8, 1949 |
| 2,473,691 | Meacham | June 21, 1949 |

OTHER REFERENCES

Article, "An Experimental Multichannel Pulse Code Modulation System," etc. by Meacham et al., pages 1–43 of Bell System Technical Journal, vol. XXVII, No. 1, January 1948.

Article, "Electron Beam Deflection Tube for Pulse Code Modulation," by Sears, pages 44–57 of Bell System Technical Journal, vol. XXVII, No. 1, January 1948.